United States Patent
Seo et al.

(10) Patent No.: US 9,288,433 B2
(45) Date of Patent: Mar. 15, 2016

(54) DIGITAL IMAGING APPARATUS AND CONTROL METHOD THEREOF

(71) Applicant: SAMSUNG ELECTRONICS CO., LTD., Suwon-si (KR)

(72) Inventors: Young Kwang Seo, Seoul (KR); Seung Kwon Park, Yongin-si (KR); Chang Yong Kim, Yongin-si (KR); Jong Jin Park, Goyang-si (KR); Woong Jae Jung, Daegu (KR); Dae Woo Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 13/730,242

(22) Filed: Dec. 28, 2012

(65) Prior Publication Data

US 2013/0169738 A1    Jul. 4, 2013

(30) Foreign Application Priority Data

Dec. 29, 2011    (KR) .................. 10-2011-0145392

(51) Int. Cl.
*H04N 7/14* (2006.01)
*H04N 5/235* (2006.01)
*H04N 19/00* (2014.01)

(52) U.S. Cl.
CPC ............ *H04N 7/141* (2013.01); *H04N 5/2354* (2013.01); *H04N 7/142* (2013.01); *H04N 7/148* (2013.01); *H04N 19/00* (2013.01)

(58) Field of Classification Search
CPC ......... H04N 7/15; H04N 7/147; H04N 7/152; H04N 7/141; H04N 7/142
USPC .................. 348/14.01, 14.08, 14.1, 14.13
See application file for complete search history.

(56) References Cited

U.S. PATENT DOCUMENTS

| | | | |
|---|---|---|---|
| 6,356,313 B1 * | 3/2002 | Champion et al. ............. 348/558 |
| 6,642,955 B1 | 11/2003 | Midgley et al. |
| 2006/0256188 A1 * | 11/2006 | Mock et al. ................. 348/14.09 |
| 2009/0079813 A1 * | 3/2009 | Hildreth ..................... 348/14.03 |
| 2009/0172756 A1 | 7/2009 | Wheatley et al. |
| 2010/0073455 A1 * | 3/2010 | Iwabuchi et al. .......... 348/14.04 |
| 2010/0165074 A1 * | 7/2010 | Ono et al. .................. 348/14.14 |
| 2012/0162347 A1 * | 6/2012 | Furumachi et al. ........ 348/14.02 |

FOREIGN PATENT DOCUMENTS

| | | |
|---|---|---|
| WO | 02/13522 A2 | 2/2002 |
| WO | 02/13522 A3 | 2/2002 |

(Continued)

OTHER PUBLICATIONS

Communication dated Jul. 4, 2013 issued by the European Patent Office in counterpart European Patent Application No. 12199363.8.

*Primary Examiner* — Quoc D Tran
(74) *Attorney, Agent, or Firm* — Sughrue Mion, PLLC

(57) ABSTRACT

A digital imaging apparatus and a control method thereof are provided. The digital imaging apparatus includes a body including a display unit configured to output an image signal as an image, and an image encoder; a user input unit comprising an image input unit configured to generate and output an outside image signal that corresponds to an outside image and is not encoded or compressed; and a data interface configured to transmit the outside image signal output by the image input unit to the body, wherein the image encoder is configured to encode the outside image signal, which is received by the body from the data interface, in a predetermined format.

17 Claims, 11 Drawing Sheets

(56) References Cited

FOREIGN PATENT DOCUMENTS

| WO | 2010/107575 | A2 | 9/2010 |
| WO | 2010/107575 | A3 | 9/2010 |
| WO | 2011/024193 | A2 | 3/2011 |
| WO | 2011/024193 | A3 | 3/2011 |

\* cited by examiner

DIGITAL IMAGING APPARATUS AND CONTROL METHOD THEREOF

CROSS-REFERENCE TO RELATED APPLICATION

This application claims the benefit of Korean Patent Application No. 2011-0145392, filed on Dec. 29, 2011 in the Korean Intellectual Property Office, the disclosure of which is incorporated herein by reference.

BACKGROUND

1. Field

Apparatuses and methods consistent with exemplary embodiments of the present disclosure relate to a digital imaging apparatus capable of performing a video call and various applications, and a control method thereof.

2. Description of the Related Art

In general, an imaging apparatus is an apparatus, such as a television (TV), configured to output an image signal in various forms after processing the image signal. A digital TV has superior ability in processing and storing a signal as compared to a conventional analog TV. Further through the Internet network connected at each household, content service of various types, such as real-time broadcasting, Content on Demand (COD), games, and video calling, may be provided to a user.

Video calls and various applications may be executed by using a Multimedia over Internet Protocol (MoIP) capability and a camera module (MoIP) that is provided at a digital TV and captures an image of a user.

Since a related art camera module is provided with a separate image encoder configured to compress the image signal of the user in order to reduce the workload of the other components digital TV, the production cost of the camera module is increased. In addition, as an image signal of a user, which is compressed in a format suitable for a video call, and an image signal of a user, which is configured to display at a display unit, are separately transmitted, the bandwidth load of a data interface is increased.

In addition, since the related art camera module is configured to generate an image signal at a low frame rate and having a low luminance, the image signal may be displayed at a display unit as an unnatural image. Further, when the body of a digital TV performs a vision processing for various applications, a less accurate outcome may result.

SUMMARY

One or more exemplary embodiments provide a digital imaging apparatus capable of reducing a material cost and a production cost of the digital imaging apparatus by compressing an outside image signal using an image encoder that is provided at a body of the digital imaging apparatus without having to be provided with a separate image encoder at a user input unit of the digital imaging apparatus, and a control method thereof.

One or more exemplary embodiments also provide a digital imaging apparatus capable of maintaining a constant frame rate even under a low luminance by being provided with a light source at a user input unit of the digital imaging apparatus, and a control method thereof.

In accordance with an aspect of an exemplary embodiment, there is provided a digital imaging apparatus including a body including a display unit configured to output an image signal as an image, and an image encoder; a user input unit comprising an image input unit configured to generate and output an outside image signal that corresponds to an outside image and is not encoded or compressed; and a data interface configured to transmit the outside image signal output by the image input unit to the body, wherein the image encoder is configured to encode the outside image signal, which is received by the body from the data interface, in a predetermined format.

The digital imaging apparatus may further include a vision processor configured to recognize a user based on the outside image signal that is received through the data interface.

The outside image signal that is generated at the image input unit may be provided with a constant frame rate regardless of the change of a luminance of surroundings of the user.

The digital imaging apparatus may further include an infrared light source and a light source controller. The infrared light source may be configured to increase the luminance of the surroundings of the user. The light source controller may be configured to obtain the luminance of the surroundings of the user based on the amount of a change in the resistance of the image input unit, and to turn ON the infrared light source in a case when the luminance obtained is below a predetermined reference value.

The digital imaging apparatus may further include an infrared light source and a light source controller. The infrared light source may be configured to increase the luminance of the surroundings of the user. The light source controller may be configured to obtain the luminance of the surroundings of the user by analyzing the outside image that is input through the image input unit, and to turn ON the infrared light source in a case when the luminance obtained is below a predetermined reference value.

The digital imaging apparatus may further include a luminance sensor, an infrared light source and a light source controller. The luminance sensor may be configured to detect the luminance of the surroundings of the user. The infrared light source may be configured to increase the luminance of the surroundings of the user. The light source controller may be configured to obtain the luminance of the surroundings of the user based on an output value of the luminance sensor, and to turn ON the infrared light source in a case when the luminance obtained is below a predetermined reference value.

The light source controller may be configured to control the intensity of the infrared light source according to the luminance obtained.

In accordance with an aspect of another exemplary embodiment, there is provided a digital imaging apparatus including a body including a display unit configured to output an image signal as an image, a Motion Joint Photographic Experts Group (MJPEG) decoder, and an image encoder; a user input unit comprising an image input unit configured to generate an outside image signal that corresponds to an outside image, and an MJPEG encoder configured to compress the outside image signal in a MJPEG format; and a data interface configured to transmit the outside image signal, which is compressed in the MJPEG format, to the body, wherein the MJPEG decoder is configured to decode the outside image signal received by the body from the data interface, and the image encoder is configured to compress the decoded outside image signal in a predetermined format.

The body may further include a vision processor configured to recognize a user based on the decoded outside image signal.

In accordance with an aspect of another exemplary embodiment, there is provided a method of controlling a digital imaging apparatus, the method including generating by a user input unit an outside image signal corresponding to an outside image; transmitting the generated outside image signal to a body of the digital imaging apparatus through a data interface in a form that is not encoded or compressed; receiving at the body the outside image signal transmitted through the data interface and recognizing a user based on the outside image signal; and executing an application of the digital imaging apparatus based on a result of the recognizing.

The method may further include compressing the outside image signal transmitted through the data interface in a predetermined format by using an image encoder provided at the body. The method may further include transmitting the outside image signal compressed to an opposite user of a video call.

The outside image signal generated at the user input unit may be provided with a constant frame rate regardless of the change of the luminance of surroundings of the user.

The user input unit may include an infrared light source configured to enhance the luminance of the surroundings, and the method may further include obtaining the luminance of the surroundings of the user based on the amount of a change in the resistance of the user input unit, and turning ON the infrared light source in a case when the luminance obtained is below a predetermined reference value.

The user input unit may include an infrared light source configured to enhance the luminance of the surroundings, and the method may further include obtaining the luminance of the surroundings of the user by analyzing the outside image that is input through the image input unit, and turning ON the infrared light source in a case when the luminance obtained is below a predetermined reference value.

The user input unit may include a luminance sensor to detect the luminance of the surroundings of the user and an infrared light source configured to enhance the luminance of the surroundings of the user, and the method may further obtaining the luminance of the surroundings of the user based on an output value of the luminance sensor, and turning ON the infrared light source in a case when the luminance obtained is below a predetermined reference value.

In accordance with an aspect of another exemplary embodiment, there is provided a method of controlling a digital imaging apparatus, the method including generating by an user input unit an outside image signal corresponding to an outside image; compressing the outside image signal by using an MJPEG encoder; transmitting the compressed outside image signal to a body of the digital imaging apparatus through a data interface; receiving at the body the compressed outside image signal transmitted through the data interface and decoding the compressed outside image signal by using an MJPEG decoder; recognizing a user based on the decoded outside image signal, and executing an application of the digital imaging apparatus based on a result of the recognizing.

The method may further include transmitting the decoded outside image signal to an opposite user after compressing the decoded outside image signal in a predetermined format.

BRIEF DESCRIPTION OF THE DRAWINGS

The and/or other aspects will become apparent and more readily appreciated from the following description of exemplary embodiments, taken in conjunction with the accompanying drawings of which.

DETAILED DESCRIPTION

Figure 1:
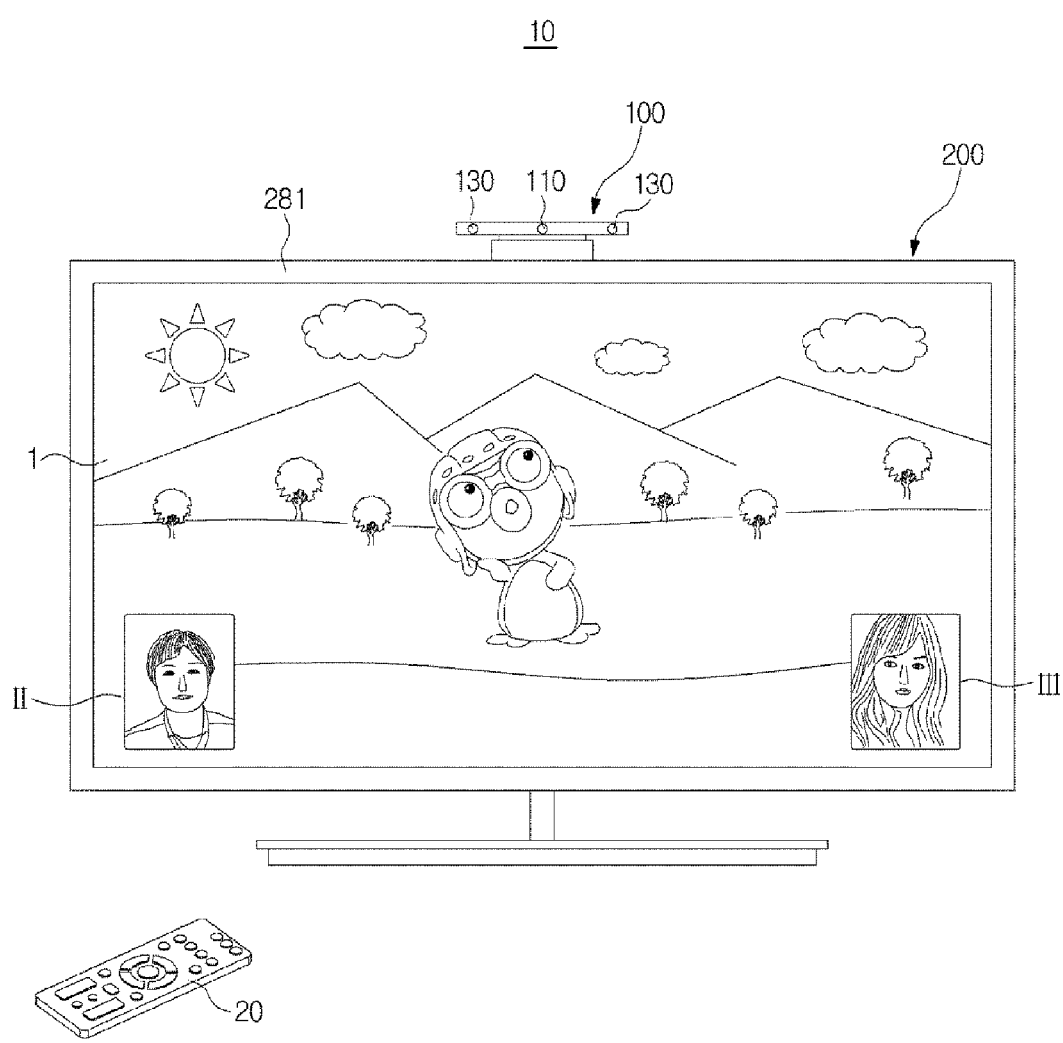
FIG. 1 is an exterior view illustrating an overall exterior of a digital imaging apparatus in accordance with an exemplary embodiment.

Certain exemplary embodiments are described in detail below with reference to the accompanying drawings, wherein like reference numerals refer to like elements throughout.

FIG. 1 is an exterior view illustrating an overall exterior of a digital imaging apparatus 10 in accordance with an exemplary embodiment.

Referring to FIG. 1, the digital imaging apparatus 10 may be implemented as a digital TV including a body 200 which includes a display unit 281 configured to output an image signal of a broadcast program or an image signal of an opposite user (other party) of a video call as an image, an acoustic output unit (not shown) configured to output the acoustic signal of a broadcast program or a speech signal of an opposite user of a video call as sound, and a user input unit 100 configured to input the image and the speech of a user.

In addition, a remote controller 20 configured to control the digital TV may be included. In addition to controlling the output of a broadcast program, the remote controller is configured to control aspects of a video call.

Three types of images may be simultaneously displayed at the display unit 281. Thus, the display unit 281 includes a broadcast domain 'I', a user domain 'II' at which an image of a user is displayed, and an opposite user domain 'III' at which an image of the opposite user is displayed. Since the three domains are simultaneously displayed at the display unit 281, a user may be able to conduct a video call while watching a broadcast program.

An acoustic output unit may include a speaker, and may be able to simultaneously output the acoustic signal, which is included in a broadcast program signal, and the speech signal of an opposite user of a video call. In the exemplary embodiment, the acoustic output unit may be provided at a rear surface of the digital imaging apparatus, but the exemplary embodiment is not limited to this configuration, and is not limited with respect to the position of the acoustic output unit so long as that the position is capable of outputting sound to a user.

The user input unit 100 may implement Multimedia over IP (MoIP), and includes a speech input unit 130 configured to input the speech of a user, and an image input unit 110 configured to input the image of a user. The speech input unit 130 may be include a microphone. Although the purpose of the speech input unit 130 is to capture and input the speech of a user, a background sound, particularly, the acoustic sound of the broadcast program output from the acoustic output unit of a digital TV or the speech of an opposite user may be input together at the speech input unit 130.

The image input unit 110 includes one or more photographing devices such as lens configured to receive the image of a user, a CCD sensor, and a CMOS sensor. By using the image input unit 110 provided at the digital imaging apparatus, the image of the user may be photographed and transmitted to an opposite user. In addition, the photographed image of the user may be displayed at the digital imaging apparatus at the side of the opposite user.

Figure 2:
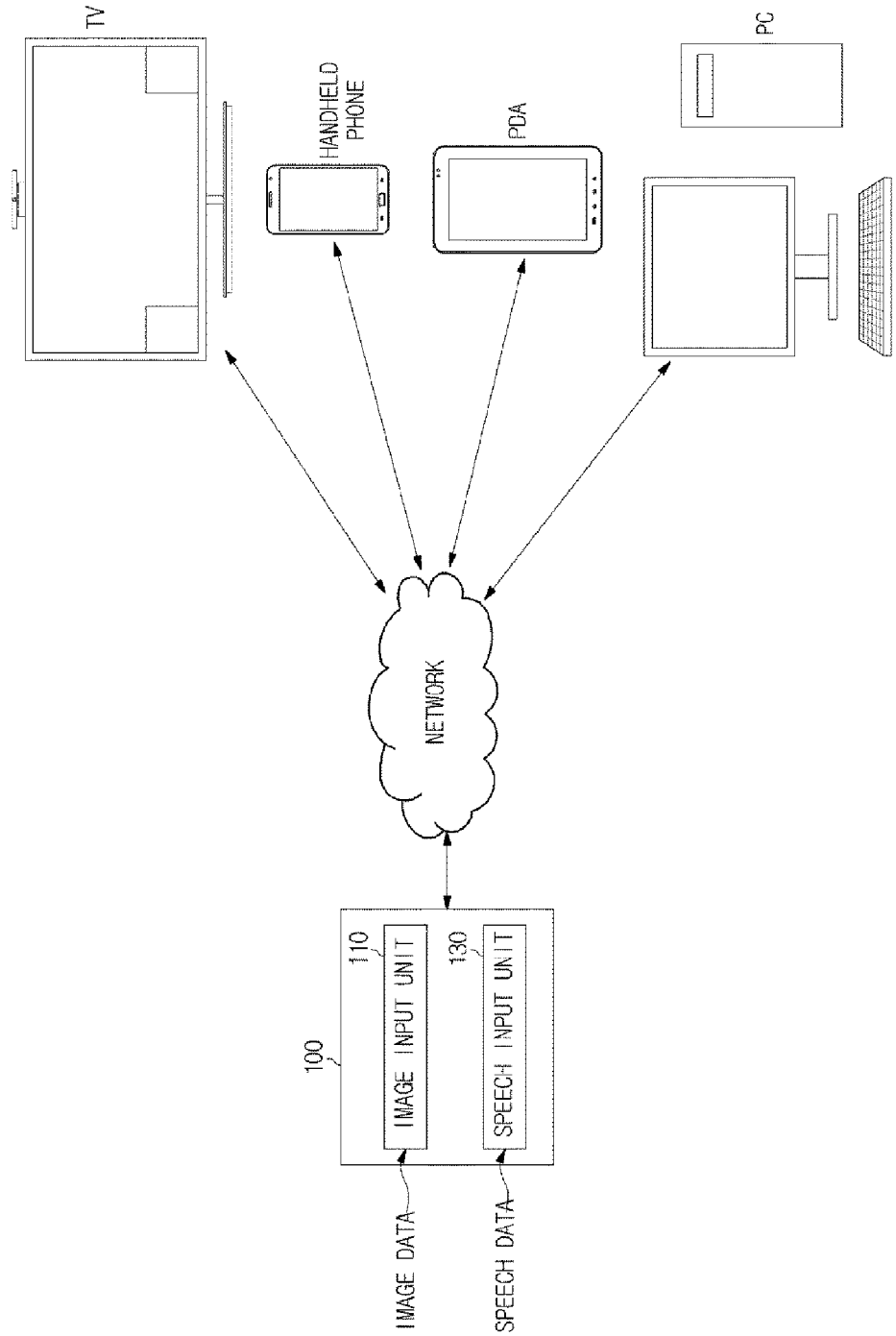
FIG. 2 is a block diagram illustrating a structure of a video call system in accordance with an exemplary embodiment.

FIG. 2 is a block diagram illustrating a structure of a video call system according to an exemplary embodiment.

The video call system is referred to as a system, by using a plurality of apparatuses capable of processing and transmitting/receiving image data and speech data, enabling a calling party and a called party to have a conversation while watching the image that is transmitted from an opposite party and while listening to the speech that is transmitted from an opposite party.

Referring to FIG. 2, the digital TV is configured to obtain the image data corresponding to the image of a user from the image input unit and obtain the speech data corresponding to the speech of a user from the speech input unit 130, and may be able to transmit the image data and the speech data obtained to outside apparatuses of the opposite user side that are connected through a wireless/cable network.

The outside apparatuses of the opposite user side may be a digital TV, a mobile terminal such as a mobile phone, a personal digital assistant (PDA), or a notebook computer, and a personal computer (PC).

The network configured to connect the digital TV of a user and the outside apparatuses of an opposite user side enables the transmitting/receiving of the image data and the speech data that are in compliance with the communication standards provided for a video call. For example, the digital TV of a user and the outside apparatuses of an opposite user side, by using the network in accordance with the Ethernet or IEEE 802.3 communication standards, may be able to transmit/receive the image data and the speech data, or by using the network in accordance with the IEEE 802.11 standard, may be able to transmit/receive the image data and the speech data.

The network, by using a Voice over Broadband (VOBB) service or a legacy service, is capable of having the transmitting/receiving of the data between the digital TV of the user side and the outside apparatuses of the opposite user side.

In detail, the VOBB service may include a service such as Voice over Cable Modem (VoCM), Voice over Digital Subscriber Line (VoDSL), Voice over Internet Protocol (VoIP), Fixed Wireless Access (FWA), Fiber To The Home (FTTH), or Voice over Asynchronous Transfer Mode (VoATM), and the legacy service may include a service such as the Integrated Service Digital Network (ISDN), the Plain Old Telephone Service (POTS), cellular, or 3G.

According to such, the digital TV and the outside apparatuses, by transmitting/receiving the image data and the speech data by using a wireless network, a telephone network, a data network such as, the Internet, a cable modem system or a cellular network, enables a video call.

The digital TV and the outside apparatuses are capable of transmitting/receiving the image data and the speech data in accordance with the standards that are set between the digital TV and the outside apparatuses, and for example, the protocols, such as the H.261 standard for coding of image data, the H.221 standard for communication of image data and speech data, and the H.242 standard for setting and releasing a call, may be used.

For example, in a case of a video call system using the Internet, the protocols, which are implemented at the H.323 standard, the H.263 standard, and the H.264 standard configured for an image coding, as well as the G.711 video call standards and the G.729 video call standards, may be used.

However, the data transmitting/receiving methods, which are used in carrying out a digital imaging apparatus in accordance with the embodiment of the present disclosure, are not limited to the examples that are described above, and as long as the digital imaging apparatus is capable of carrying out a video call, the method thereof is not limited.

Figure 3:
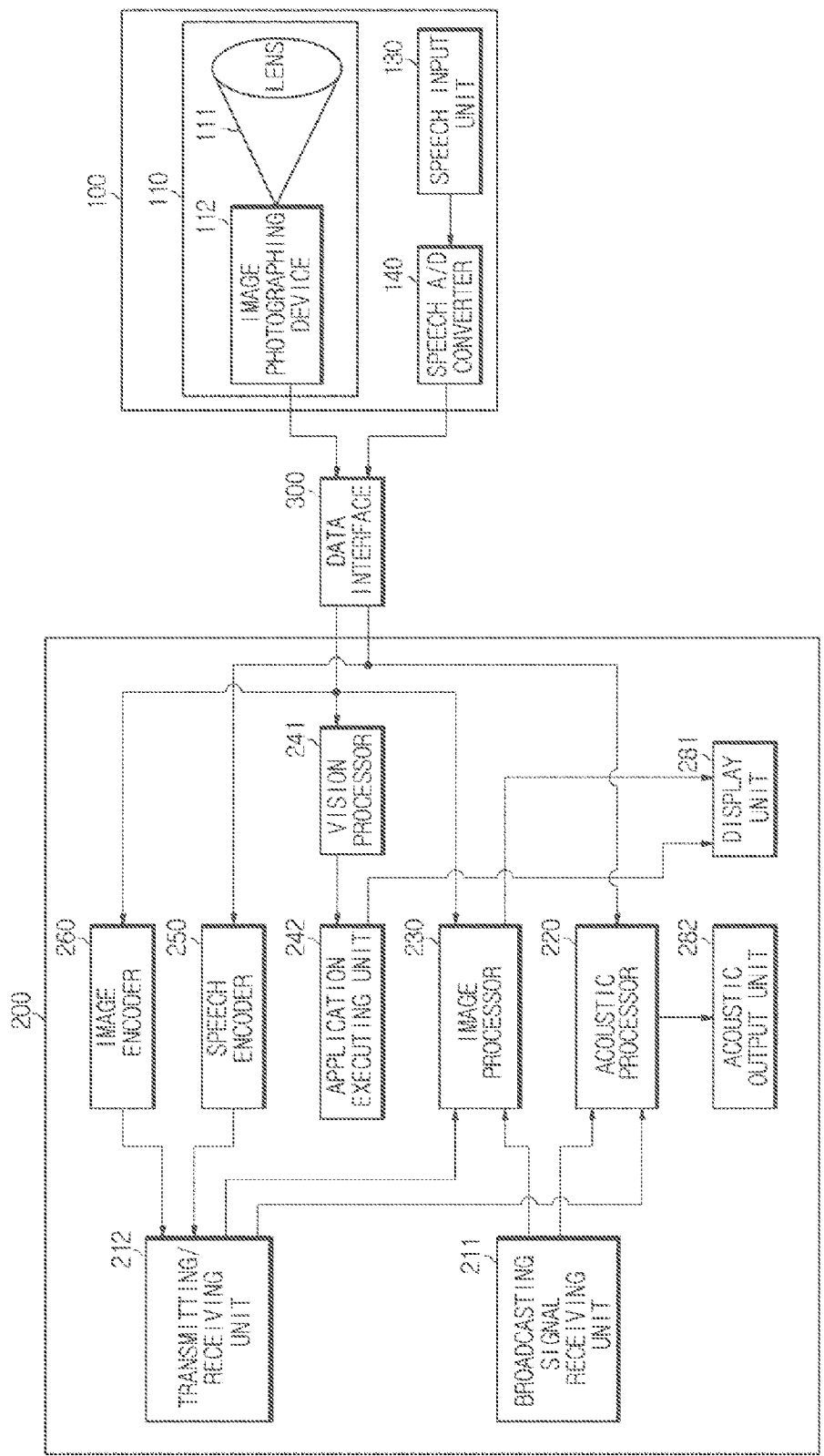
FIG. 3 is a control block diagram of a digital imaging apparatus in accordance with in accordance with a first exemplary embodiment.

FIG. 3 is a control block diagram of a digital imaging apparatus in accordance with a first exemplary embodiment of the present disclosure.

Referring to FIG. 3, the digital imaging apparatus in accordance with an exemplary embodiment includes a broadcast signal receiving unit 211 configured to receive a broadcast signal; a transmitting/receiving unit 212 configured to transmit and receive an image signal and a speech signal from an opposite user; an acoustic processor 220 configured to decode the acoustic signal received from the broadcast signal receiving unit 211 and transmitting/receiving unit 212; an acoustic output unit 282 configured to output the acoustic signal that is decoded by the acoustic processor 220; the user input unit 100 at which the image and the speech of a user are input; and an image encoder 260 configured to compress the image signal of a user.

The broadcast signal receiving unit 211 is configured to receive the broadcast signal including the image signal and the acoustic signal. The broadcast signal receiving unit 211 may include an antenna and a tuner, as the image signal is output in the form of an image through the display unit 281 and the acoustic signal is output in the form of the acoustic sound through the acoustic output unit 282.

The transmitting/receiving unit 212, through a predetermined communication path, receives the image signal and the speech signal from an opposite user of a video call, and transmits the image signal and the speech signal of a user to the opposite user of a video call. The predetermined communication path that is used at the transmitting/receiving unit 212, as described above, may be a communication network having the Internet, the Ethernet host, and a public switched telephone network, or may be a one-to-one communication network. In addition, wireless/cable communication networks may all be included in the communication path.

The user input unit 100 may implement MoIP, and includes the image input unit 110 configured to receive an image from a user and the speech input unit 130 configured to receive h a speech from a user. The image input unit 110 and the speech input unit 130 may convert the data with reference to the image and the speech that are input into the image signal and the speech signal. The user input unit 100 is not provided with an image encoder that is configured to compress the image signal that is output from the image input unit 110.

The image input unit 110 includes a lens 111 configured to receive the image of a user in the form of a light signal, and an image photographing device 112 configured to output the image signal of a user that corresponds to the image of the user. The image photographing device 112 may be implemented in the form of a CCD sensor or a CMOS sensor. The image photographing device 112 may include an image analog-to-digital (A/D) converter configured to convert the electrical signal into a digital signal that may be processed as data, and an Image Signal Processor (ISP) configured to execute an image processing with respect to the image signal that is converted into the digital signal.

As a reference, the image of a user may be included or may be not included in the image that is input through the user input unit, and the speech of a user may be included or may not be included in the speech that is input through the user input unit. In the exemplary embodiments described hereinafter, the image that is input through the user input unit 100 is referred to as an 'outside image', and the speech that is input through the user input unit 100 is referred to as an 'outside speech'.

The outside image signal that is generated at the image input unit 110 may be the signal that is subjected to the digital conversion and the image processing. However, regardless of whether the outside image signal is subjected to the digital conversion and the image processing, the image signal that is output is transmitted to the body 200 through a data interface 300 in the form of raw data, i.e., data that is not compressed or encoded.

A speech A/D converter 140 is configured to execute a sampling that converts the speech signal, which is input through the speech input unit 130, into the digital signal, and the speech signal that is converted into the digital signal is compressed at the body 200 to be transmitted to an opposite user.

The user input unit 100 and the body 200 may be connected to each other through the data interface 300, and as one embodiment, the data interface 300 may be an USB interface. However, the exemplary embodiment is not limited hereto, and various interfaces configured to connect the body 200 and the user input unit 100 may be used. The user input unit 100 may be mounted on the body 200

The image encoder 260 is included in the body 200 of the digital imaging apparatus in order to transmit data to other mobile apparatuses and to execute various applications. The image encoder 260, by compressing the outside image signal that is received through the data interface 300 according to the transmission format, may transmit the compressed outside image signal to an opposite user through the transmitting/receiving unit 212. For example, in a case when the H.264 standard is used as the transmission format, the image encoder 260 compresses the outside image signal according to the H.264 format, and provides the compressed outside image signal to the transmitting/receiving unit 212.

Thus, the digital imaging apparatus in accordance with the first exemplary embodiment transmits the outside image signal in the form of raw data to the body 200, and uses the image encoder 260 provided in the body 200 to compress the outside image signal without having a separate image encoder provided in the user input unit 100. As a result, a production cost may be reduced.

In addition, since the image signal is not compressed at the user input unit 100, a signal synthesis unit configured to synchronize with the speech signal is not needed in the user input unit 100, and a signal separating unit is not needed in the body 200.

A speech encoder 250 compresses the outside speech signal received through the data interface 300, and provides the compressed outside speech signal to the transmitting/receiving unit 212.

The transmitting/receiving unit 212 transmits the compressed outside image signal and the compressed outside speech signal that are received from the image encoder 260 and the speech encoder 250 to an opposite user, and through a predetermined communication path, an encoded image signal and speech signal are received from the opposite user. The received image signal is transmitted to an image processor 230, and the received speech signal is transmitted to the speech processor 220.

The broadcast image signal and the broadcast acoustic signal that are received through the broadcast signal receiving unit 211 as well are transmitted to the image processor 230 and to the acoustic processor 220, respectively.

The acoustic processor 220 includes a decoder configured to decode the compressed acoustic signal, and decodes the broadcast acoustic signal received through the broadcast signal receiving unit 211 and the speech signal of an opposite user received through the transmitting/receiving unit 212. In addition, the acoustic processor 220 is provided with an acoustic digital-to-analog (D/A) converter to convert the acoustic signal, that is, the digital signal, into an analog signal, and then transmits the analog acoustic signal to the acoustic output unit 282.

The image processor 230 processes the image signal received at the broadcast signal receiving unit 211, the outside image signal received through the data interface 300, and the image signal of an opposite user received from the transmitting/receiving unit 212, and outputs the processed image signals via the display unit 281.

The image processor 230 decodes each the broadcast image signal and the image signal of an opposite user, and processes the broadcast image signal and the image signal of an opposite user into a plurality of layers to be output at the display unit 281. The decoder that decodes the broadcast image signal and the decoder that decodes the image signal of an opposite user may decoders that are physically independent. For example, the broadcast image signal and the image signal of an opposite user may be processed as a first layer, while the outside image signal may be processed as a second layer, which is overlapped with the first layer. The image processor 230 may synchronize each image signal into a structure of various layers to be output by the display unit 281.

In addition, the image processor 230 performs processing of various images to output the broadcast image, the image of an opposite user, or the outside image at the display unit 281. The image processor 230 is provided with the image D/A converter to convert the image signal into the analog signal, and provides the analog signal to the display unit 281.

The display unit 281 displays the three types of images that are output from the image processor 230. The display unit 281 may be implemented in the form of liquid crystal display (LCD) panel, an organic light emitting diode (OLED) panel, a light emitting diode (LED) panel, or a plasma display panel (PDP).

The acoustic output unit 282, by outputting the speech signal of an opposite user and the broadcast acoustic signal transmitted from the acoustic processor 220, enables a user to listen to the speech of the opposite user and the acoustic sound of the broadcast program.

In addition to being capable of providing a broadcast program or a video call, the digital imaging apparatus is capable of executing various applications. As in a smart phone, applications may be downloaded on the network to be executed, and many applications are provided on the basis of recognizing the motion of a user. Thus, the body 200 of the digital imaging apparatus may include a vision processor 241, which is used in recognition of a user, and an application executing unit 242 configured to execute the applications on the basis of the processing result of the vision processor 241 and to display the execution results on the display unit 281. Here, the recognizing of a user includes the recognizing of the motion of a user, the recognizing of the face of a user, the recognizing of the facial expression of a user, and the recognizing of the presence of a user.

Since the vision processor 241 uses the outside image signal that is transmitted from the user input unit 100 in the form of raw data, there is no loss of data that may occur from the compression of the data such that a precise result may be obtained.

Figure 4:
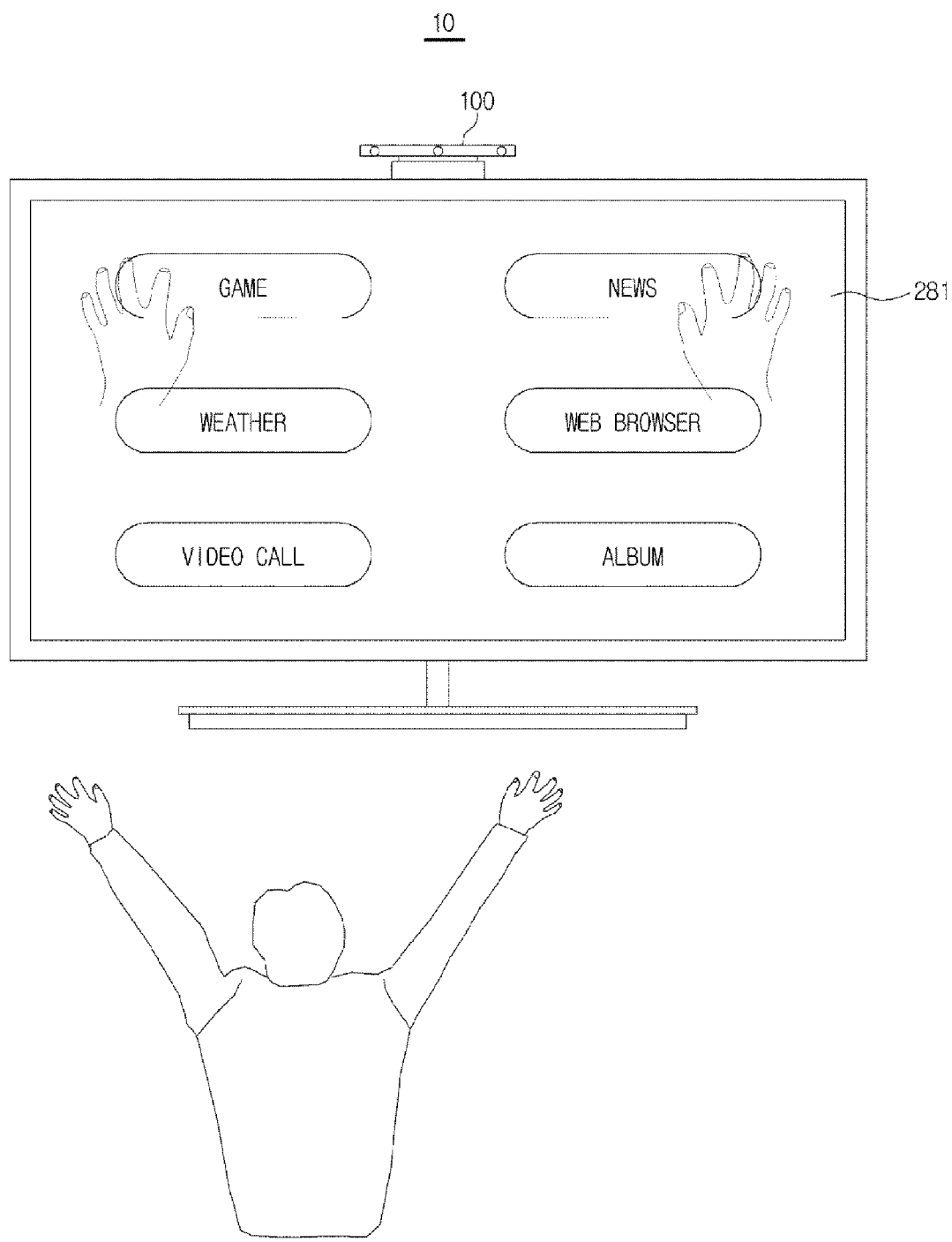
FIG. 4 is a screen of an application implemented at a digital imaging apparatus in accordance with in accordance with an exemplary embodiment.

FIG. 4 is a screen of an application implemented at a digital imaging apparatus in accordance with an exemplary embodiment. The digital imaging apparatus 10 in accordance with an exemplary embodiment is capable of executing various applications. For example, as illustrated on FIG. 4, a menu displayed at the display unit 281 may be selected by a user by directly touching the display unit 281 or by a motion, without having to use an input apparatus such as a remote controller.

At this time, the user input unit 100 of the digital imaging apparatus 10 in accordance with the first exemplary embodiment transmits the outside image signal, which is provided in the form of raw data, to the body 200, and the vision processor 241 of the body 200, by using the signal transmitted, recognizes a user. Since the signal provided in the form of raw data is capable of precisely detecting an edge, the vision processor 241 may be able to precisely recognize a user, and the accuracy of the application that is executed is also enhanced.

FIG. 4 is an exemplary embodiment of the application that may be applied to the present disclosure, and other various applications such as a game provided on the basis of the motion of a user may be applied.

Figure 5:
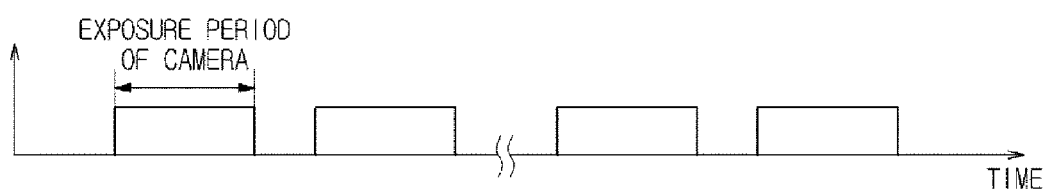
FIG. 5 is a time chart showing an exposure period of a camera when an outside image is photographed by a user input unit of a conventional digital imaging apparatus under a low luminance.

FIG. 5 is a time chart showing an exposure period of a camera when an outside image is photographed by a user input unit of a related art digital imaging apparatus under a low luminance atmosphere.

In general, the user input unit of the digital imaging apparatus, in a case when the surrounding environment of the subject is dim, as to obtain a clear image, lowers a frame rate. This is performed, as illustrated on FIG. 5, to enhance the clarity and the brightness of the image photographed while the photographing is performed by extending the exposure period of the camera. For example, in a case where the surrounding environment of the subject is represented with a low luminance of about 30 lux, the user input unit lowers the frame rate to about 15 fps.

However, in order for the vision processor of the digital imaging apparatus to recognize the hand gesture of a user, the outside image signal is needed to be provided with the frame rate at about above 30 fps. Thus, in a case where the user input unit is to transmit the outside image signal provided with a lower frame rate under a low luminance condition, the vision processor may not be able to precisely recognize the motion of a user.

Thus, the digital imaging apparatus in accordance with an exemplary embodiment is provided with a separate light source at the user input unit 100 to photograph an outside image while maintaining a constant frame rate even under a low luminance condition.

Figure 6:
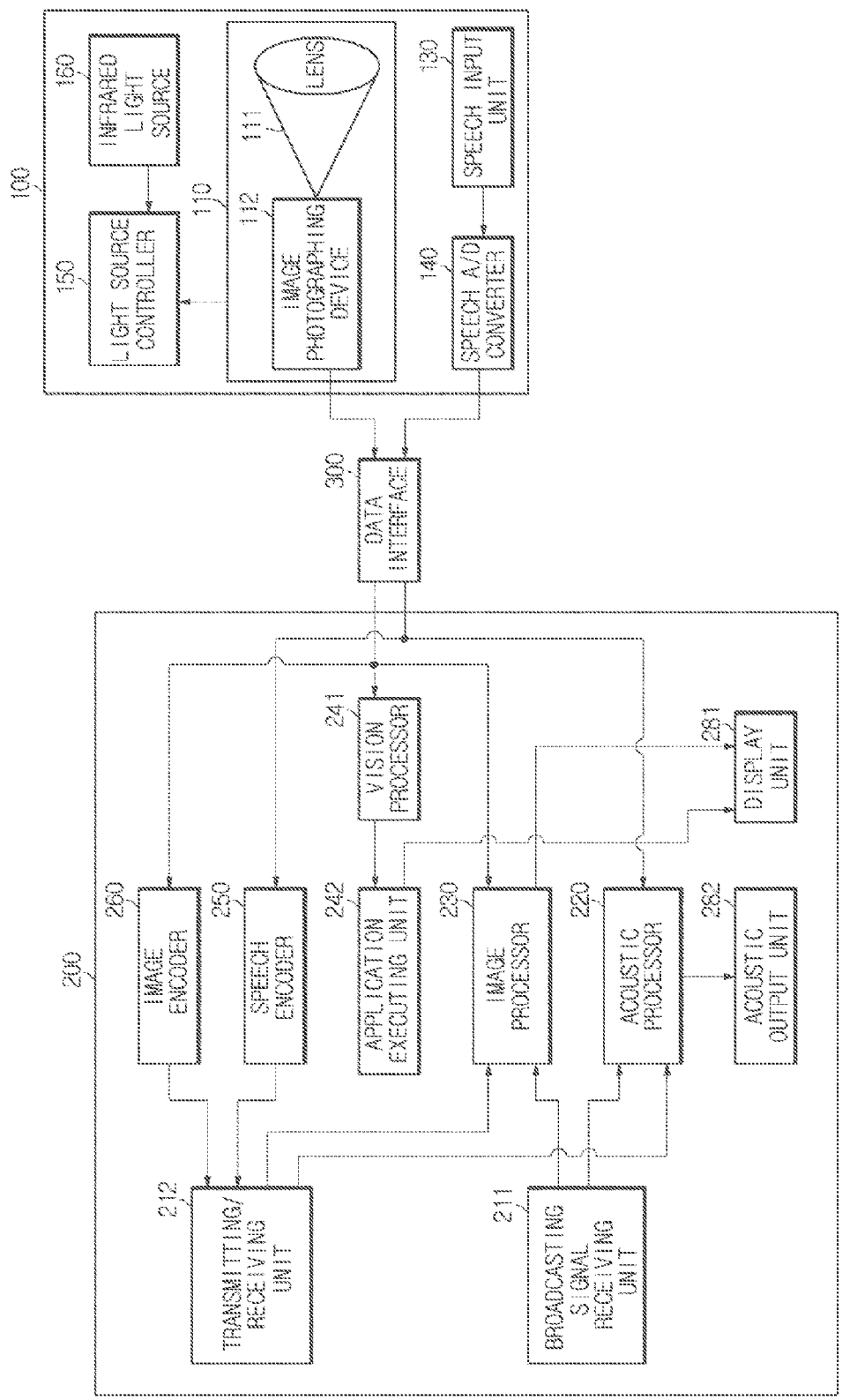
FIG. 6 is a control block diagram of a digital imaging apparatus having a separate light source at a user input unit, in accordance with in accordance with an exemplary embodiment.

FIG. 6 is a control block diagram of a digital imaging apparatus having a separate light source at a user input unit, in accordance with an exemplary embodiment.

Since the components other than a light source controller 150 and an infrared light source 160 of FIG. 6 were previously described with regard to FIG. 3, overlapping descriptions will be omitted.

Referring to FIG. 6, the user input unit 100 of the digital imaging apparatus in accordance with an exemplary embodiment includes the infrared light source 160 and the light source controller 150 configured to control the infrared light source 160.

The infrared light source 160, in order to increase the luminance of the surroundings of a user, is exposed outside the user input unit 100, and since infrared light is used as the light source, the glare on a user may be prevented. The infrared light source may include the light source of the near infrared light domain in addition to the light source of the infrared light domain.

The light source controller 150 controls turning ON/OFF the light source 160 and an intensity of the infrared light source 160. The light source controller 150, in a case where the luminance of the surroundings of a user is below a predetermined reference value, may turn ON the infrared light source 160, and according to the luminance, the intensity of the infrared light source 160 may be appropriately controlled. For example, when the luminance is lower, the intensity of the light source is controlled to be stronger, and when the luminance is higher, the intensity of the light source is controlled to be weaker.

In the exemplary embodiment, the luminance of the surroundings of a user may be obtained by analyzing the outside image that is input through the image input unit 110 or analyzing a change in a resistance value of the image photographing device 112, while the predetermined reference value may be determined by considering the frame rate that affects the result of the vision processor 241 or at which the outside image output through the display unit 281 becomes unnatural. As one example, having about 300 lux as the predetermined reference value may be possible.

Figure 7:
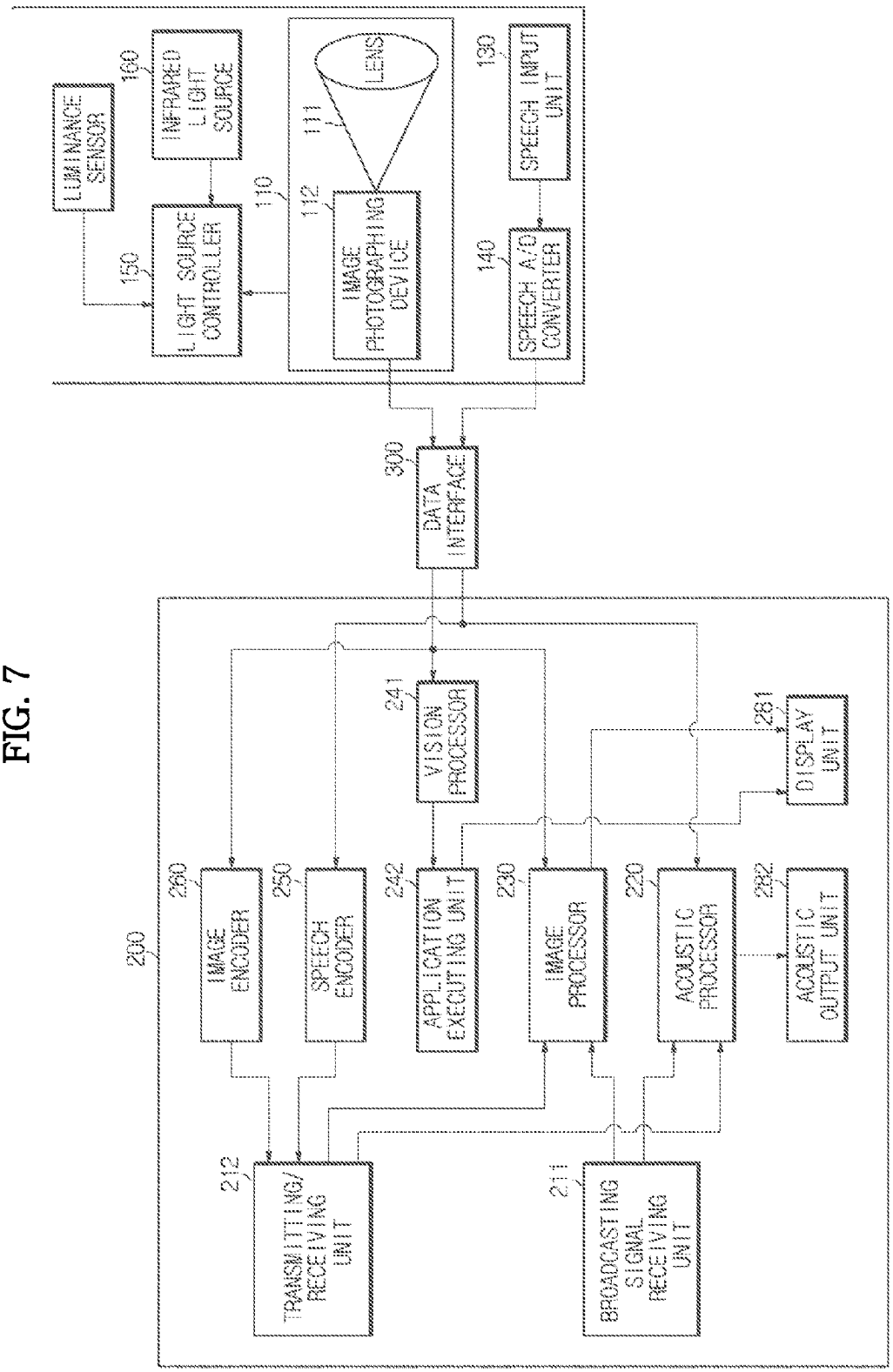
FIG. 7 is a control block diagram of a digital imaging apparatus having a separate light source at a user input unit, in accordance with in accordance with an exemplary embodiment.

FIG. 7 is a control block diagram of a digital imaging apparatus having a separate light source at a user input unit, in accordance with another exemplary embodiment.

Since the components other than the light source controller 150, a luminance sensor 170, and the infrared light source 160 of FIG. 7 were previously described with regard to FIG. 3, overlapping descriptions will be omitted.

In the exemplary embodiment, the luminance sensor 170 directly detects the luminance of the surroundings of a user, and the light source controller 150, on the basis of the output value of the luminance sensor 170, controls turning ON/OFF the infrared light source 160 and the intensity of the infrared light source 160. The descriptions of these operations are same as the descriptions previously provided with regard FIG. 6.

As in the embodiment of FIG. 7, when the luminance of the surrounding of a user is obtained from the luminance sensor 170, an Inter-Integrated Circuit (I2C) interruption, which may occur during an analysis of the change in the resistance value of the image photographing device 111, may be prevented, and the workloads of the light source controller 150, which may occur while obtaining a luminance by analyzing an outside image, may be also prevented.

As illustrated on FIGS. 6 to 7, by having the infrared light source at the user input unit 100, in a case when the luminance of the surroundings of a user is below a predetermined reference value, if the infrared light source is turned ON, regardless of the actual luminance of the surroundings of a user, an outside image signal having a constant frame rate at all times may be transmitted to the body 200. Thus, even when an outside image is photographed under a dim condition, the frame rate of the outside image signal transmitted to the body is not lowered, and the accuracy of the vision processor may be maintained.

Figure 8:
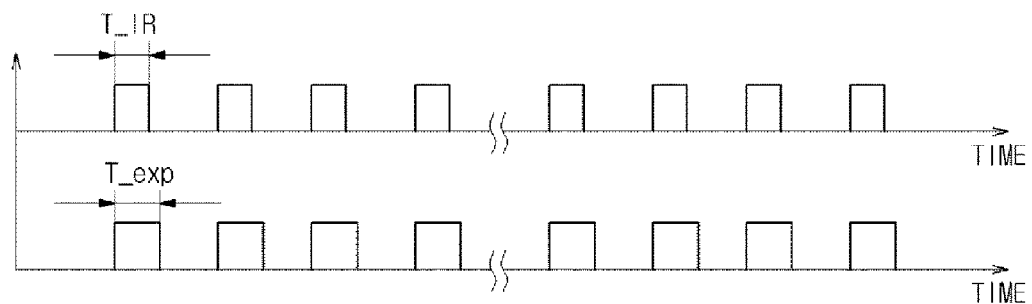
FIG. 8 is a time chart showing an ON time of an infrared light source and an exposure time of an image input unit.

FIG. 8 is a time chart showing an ON time of the infrared light source 160 and an exposure time of the image input unit 110.

Referring to FIG. 8, the digital imaging apparatus in accordance with an exemplary embodiment is not needed to extend an exposure period (T_exp) of the image input unit 110 even under a low-luminance condition, and the light source controller 150, by turning the infrared light source 160ON only in the exposure period (T_exp) of the image input unit 110, the ON time (T_IR) of the infrared light source 160 may be made less than or same as the exposure period (T_exp) of the image input unit 110. Thus, by minimizing the power loss by the infrared light source 160, the operation of the infrared light source 160 may be efficiently controlled.

Figure 9:
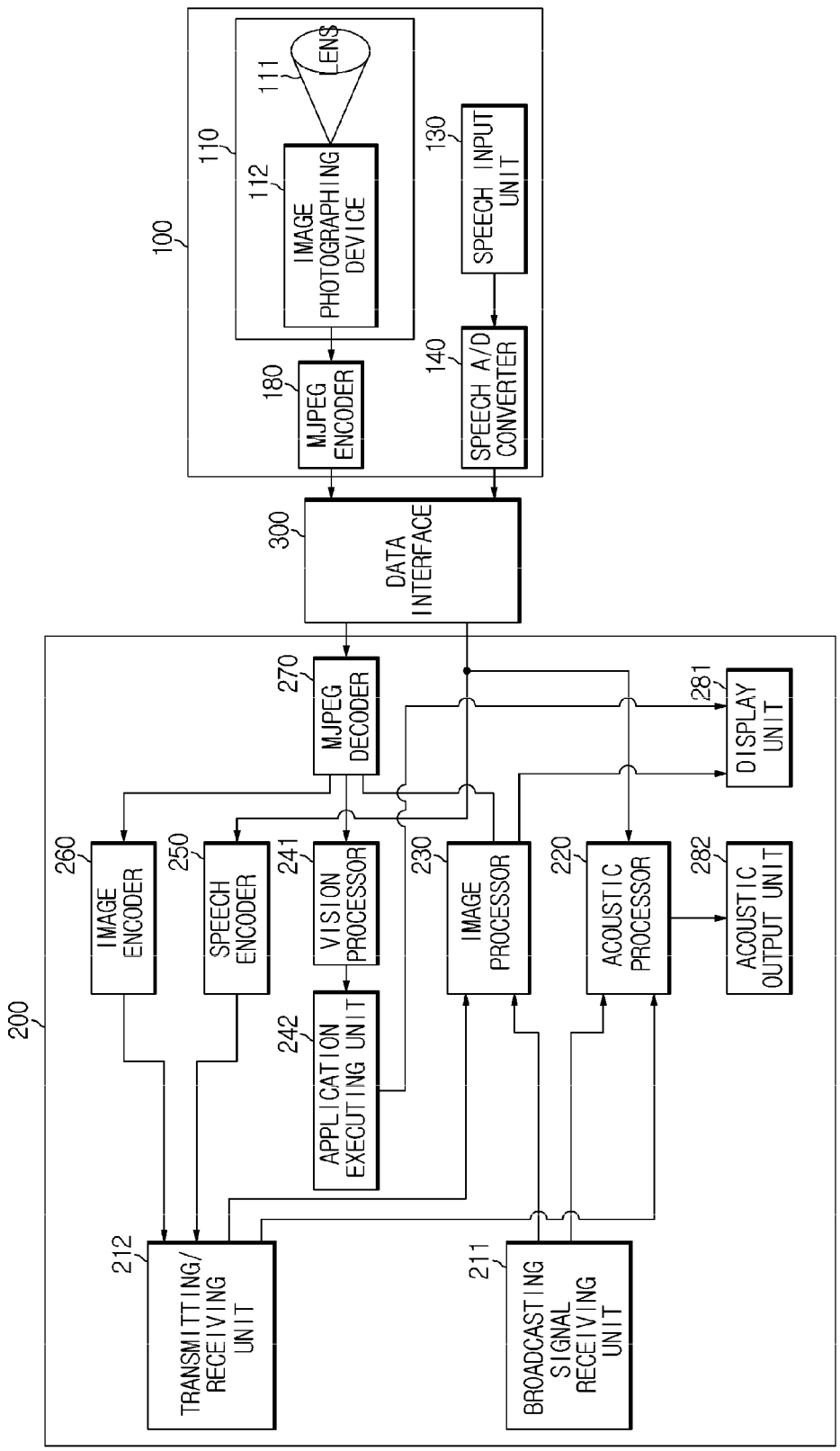
FIG. 9 is a control block diagram of a digital imaging apparatus in accordance with a second exemplary embodiment.

FIG. 9 is a control block diagram of a digital imaging apparatus in accordance with the second exemplary embodiment.

Referring to FIG. 9, the digital imaging apparatus in accordance with the second exemplary embodiment further includes a Motion Joint Photographic Experts Group (MJPEG) encoder 180 and an MJPEG decoder 270 in addition to the digital imaging apparatus in accordance with the first embodiment, which is described above.

In a case where the data interface 300 has a smaller bandwidth, transmitting raw data having a large capacity from the user input unit 100 to the body 200 can present difficulty. Thus, in this case, the MJPEG encoder 180, which is configured to compress an outside image signal in an MJPEG format, is provided at the user input unit 100, and the compressed outside image signal is transmitted to the body 200 through the data interface 300.

Although the outside image signal is compressed through the MJPEG encoder 180, the compression rate is not high, and thus the loss of data is relatively small. As one example, when the image signal having a resolution of 640×480 is transmitted, the network usage amount is about an average of 1M when the image signal is compressed in the H.264 format, and the network usage amount is about an average of 3M when the image signal is compressed in the MJPEG format. That is, in a case when an image signal is compressed in the MJPEG format, the data capacity is larger, such that the loss of data is smaller.

The MJPEG decoder 270 is provided at the body 200, and after the outside image signal transmitted through the data interface 300 is decoded (released from the compression) at the MJPEG decoder 180, the decoded outside image signal is transmitted to the image encoder 260 to be compressed in the transmission format, that is, in the H.264 format, so that the compressed outside image signal is transmitted to an opposite user. Alternatively, the decoded outside image signal may be transmitted to the vision processor 241 to be used at the execution of the applications. Alternatively, the decoded outside image signal may be transmitted to the image processor 230 and subjected to the image processing to be output through the display unit 281.

In the second embodiment above, the MJPEG encoder 180 and the MJPEG decoder 270 are used, but a lossless codec configured to prevent the loss of data due to compression may also be used.

With respect to the second exemplary embodiment, by having the user input unit 100 further provided with the infrared light source 160 and the light source controller 150, an outside image signal having a constant frame rate maintained even under a low luminance condition may be transmitted to the body 200. In addition, with respect to having the light source controller 150 obtaining the luminance of the surroundings of a user, as already described with regard to FIGS. 6 to 7, the method of analyzing the image of the image input unit 110, the method of analyzing the change in the resistance value of the image photographing device 111, and the method of obtaining the luminance from the output value of the luminance sensor while provided with the luminance sensor 170 may be applied in the same manner in the second embodiment.

Hereinafter, a method of controlling a digital imaging apparatus in accordance with an exemplary embodiment will be described.

Figure 10:
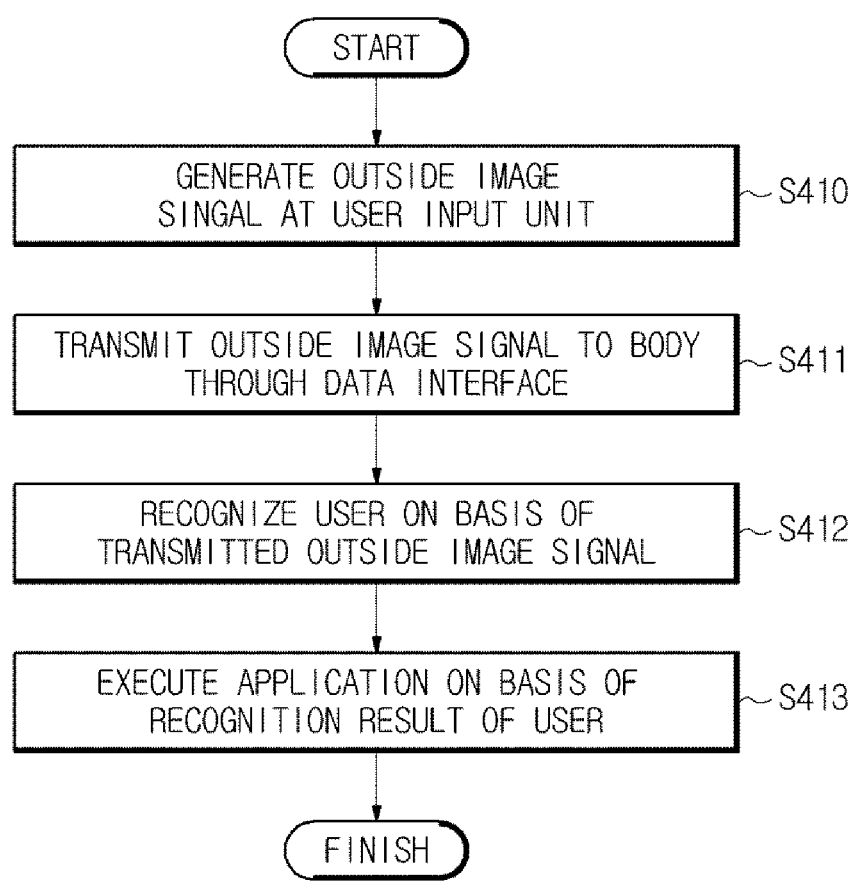
FIG. 10 is a flow chart on the control method of a digital imaging apparatus in accordance with a first exemplary embodiment.

FIG. 10 is a flow chart on the control method of a digital imaging apparatus in accordance with the first exemplary embodiment.

Referring to FIG. 10, first, an outside image signal is generated at the user input unit 100 (S410). Here, the generating of the outside image signal is referred to as receiving an outside image as a light signal through the lens, and converting the light signal into the electrical signal at the image photographing device that is implemented as an image sensor. The generating of the outside image signal may further include converting the electrical signal into a digital signal by the image A/D converter that is included in the image photographing device, and performing an image processing on the digital signal by the image signal processor.

Through the data interface, the outside image signal is transmitted to the body (S411). Here, the signal that is transmitted to the body through the data interface is the outside image signal in the form of raw data that is not compressed.

When the outside image signal is transmitted through the body, the vision processor included at the body recognizes a user on the basis of the outside image signal (S412). Since the vision processer uses the outside image signal in the form of raw data, the accuracy of the result calculated is enhanced.

Then, on the basis of the recognition result of a user, the application of the digital imaging apparatus is executed (S413). Here, the application may be any application from the various applications, which may be executed at the digital imaging apparatus, as long as the application is executed based on the recognition of a user.

The description illustrated in FIG. 10 has been made in relation that the image photographed at the user input unit 100 is used at the application of the digital imaging apparatus. However, the image is compressed in the transmission format, for example, the H.264 format, by the image encoder 260, which is included in the body 200, to be transmitted to an opposite user through the transmitting/receiving unit 211.

Figure 11:
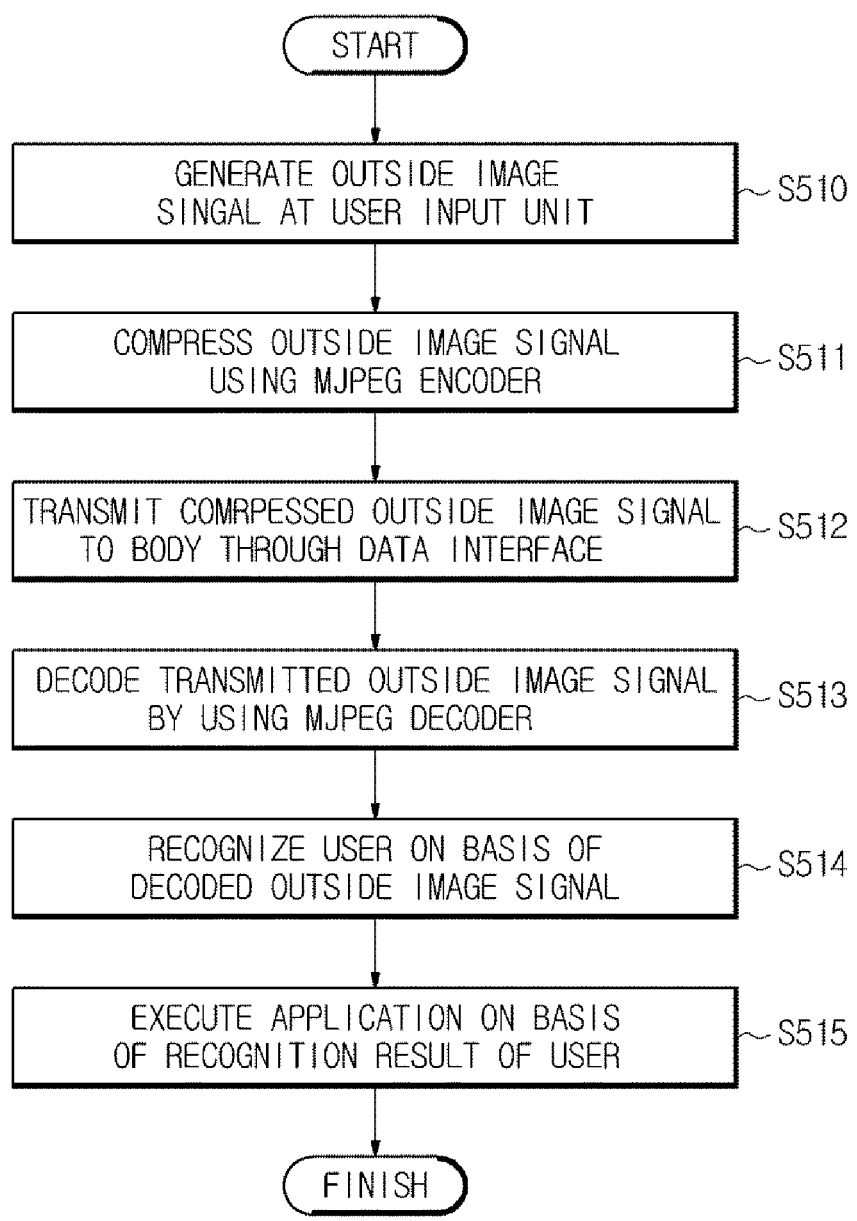
FIG. 11 is a flow chart on the control method of a digital imaging apparatus in accordance with a second exemplary embodiment.

FIG. 11 is a flow chart on the control method of a digital imaging apparatus in accordance with the second exemplary embodiment.

Referring to FIG. 11, first, an outside image signal is generated at the user input unit 100 (S510). Here, the generating of the outside image signal, as described above, is referred to as receiving an outside image as a light signal through the lens 111, and converting the light signal into the electrical signal at the image photographing device 112 that is implemented as an image sensor. In addition, the generating of the outside image signal may further include converting the outside image signal into a digital signal by the image A/D converter that is included in the image photographing device 112, and performing the image processing on an image signal by the image signal processor.

The outside image signal is compressed by the MJPEG encoder (S511). The MJPEG encoder is the encoder that is generally used in compressing a video, and the compression rate of the MJPEG encoder is relatively not large, as well as the loss of data by the compression is relatively small.

The compressed outside image signal is transmitted to the body 200 through the data interface 300 (S512). Then, the transmitted outside image signal is decoded (released from the compression) by using the MJPEG decoder 270 (S513). That is, according to the control method of the digital imaging apparatus of the second exemplary embodiment, the digital imaging apparatus has the MJPEG encoder 180 at the user input unit 100 and has the MJPEG decoder 27 at the body 200.

The decoded outside image signal is transmitted to the vision processor 241 at the body, and the vision processor 241 recognizes a user on the basis of the decoded outside image signal (S514). Then, on the basis of the recognition of a user, the application of the digital imaging apparatus is executed (S515).

In the control method of the digital imaging apparatus in accordance with the first exemplary embodiment and the control method of the digital imaging apparatus in accordance with the second exemplary embodiment, the infrared light source 160 and the light source controller 150 may be included at the user input unit 100. If the luminance of the surroundings of a user, which is obtained by analyzing the outside image input through the image input unit 110 and analyzing the change in the resistance value of the image photographing device 112, is below a predetermined reference value, the frame rate of the outside image signal may be constantly maintained even in the low luminance condition by turning ON the infrared light source 160.

By further having the luminance sensor 170 at the user input unit 100, the obtaining of the luminance of the surroundings of a user from the output value of the luminance sensor 170 may be possible.

As described above, according to the digital imaging apparatus and a control method thereof in accordance with the exemplary embodiments, the outside image signal is compressed in the transmission format by the image encoder provided at the body without having an image encoder at the user input unit 100, and thereby the material cost and the production cost may be reduced.

In addition, by transmitting the outside image signal having the form of raw data at the user input unit 100, the accuracy of the vision processing performed based on the outside image signal transmitted from the user input unit 100 is enhanced.

In addition, by having the light source at the user input unit 100 and by turning ON the light source under the low luminance condition, the constant frame rate is maintained even under the low luminance condition, and thereby a natural exterior image may be displayed, while the accuracy of the vision processing result may be enhanced.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A digital imaging apparatus comprising:
a body comprising;
    a display unit configured to output an image signal as an image;
    an image processor configured to generate the image signal;
    an image encoder configured to generate an encoded signal; and
    a communicator configured to transmit data to and receive data from an outside apparatus;
a user input unit comprising an image input unit configured to generate and output an outside image signal that corresponds to an outside image and is not encoded or compressed; and
a data interface configured to receive the outside image signal from the user input unit, and transmit the outside image signal to the image processor and the image encoder,
wherein the display unit is further configured to receive the image signal from the image processor, and
the image encoder is further configured to generate the encoded signal based on the outside image signal, which is received from the data interface, and transmit the encoded signal to the communicator in a predetermined format.

2. The digital imaging apparatus of claim 1, wherein the body further comprises:
    a vision processor configured to recognize a user based on the outside image signal that is received through the data interface.

3. The digital imaging apparatus of claim 2, wherein:
the outside image signal is generated at the image input unit to have a constant frame rate regardless of a change of a luminance of surroundings of the user.

4. The digital imaging apparatus of claim 3, wherein the user input unit further comprises:
    an infrared light source configured to increase the luminance of the surroundings of the user; and
    a light source controller configured to obtain the luminance of the surroundings of the user based on an amount of a change in a resistance of the image input unit, and to turn on the infrared light source when the obtained luminance is below a reference value.

5. The digital imaging apparatus of claim 3, wherein the user input unit further comprises:
    an infrared light source configured to increase the luminance of the surroundings of the user; and
    a light source controller configured to obtain the luminance of the surroundings of the user by analyzing the outside image that is input through the image input unit, and to turn on the infrared light source in a case when the luminance obtained is below a predetermined reference value.

6. The digital imaging apparatus of claim 3, wherein the user input unit further comprises:
    a luminance sensor configured to detect the luminance of the surroundings of the user;
    an infrared light source configured to increase the luminance of the surroundings of the user; and
    a light source controller configured to obtain the luminance of the surroundings of the user based on an output value of the luminance sensor, and to turn on the infrared light source when the luminance obtained is below a reference value.

7. The digital imaging apparatus of claim 4, wherein:
the light source controller is configured to control an intensity of the infrared light source according to the obtained luminance.

8. A digital imaging apparatus comprising:
a body comprising;
    a display unit configured to output an image signal as an image;
    a Motion Joint Photographic Experts Group (MJPEG) decoder; and
    an image encoder configured to generate an encoded signal;

an image processor configured to generate the image signal; and a communicator configured to transmit data to and receive data from an outside apparatus;

a user input unit comprising an image input unit configured to generate an outside image signal that corresponds to an outside image, and an MJPEG encoder configured to compress the outside image signal into an MJPEG compressed outside image signal; and a data interface configured to receive the MJPEG compressed outside image signal, and transmit the MJPEG compressed outside image signal to the MJPEG decoder, wherein the MJPEG decoder is configured to decode the MJPEG compressed outside image signal received from the data interface into a decoded outside image signal, the display is further configured to output the image signal based on the decoded outside image signal, and the image encoder is further configured to generate the encoded signal based on the outside image signal, and transmit the encoded signal to the communicator in a predetermined format.

9. The digital imaging apparatus of claim 8, wherein:
the body further comprises a vision processor configured to recognize a user based on the decoded outside image signal.

10. A method of controlling a digital imaging apparatus, the method comprising:
generating by a user input unit an outside image signal corresponding to an outside image;
transmitting the generated outside image signal to a body of the digital imaging apparatus through a data interface in a form that is not encoded or compressed;
receiving at the body the outside image signal transmitted through the data interface;
recognizing a user based on the outside image signal that is not encoded or compressed;
executing an application of the digital imaging apparatus based on a result of the recognizing;
displaying an image based on the outside image signal that is not encoded or compressed;
compressing the outside image signal into a compressed outside image signal; and
transmitting the compressed outside image signal to an outside apparatus.

11. The method of claim 10, wherein:
the outside image signal generated by the user input unit is provided with a constant frame rate regardless of a change of a luminance of surroundings of the user.

12. The method of claim 11, wherein the user input unit includes an infrared light source configured to enhance the luminance of the surroundings,
wherein the method further comprises:
obtaining the luminance of the surroundings of the user based on an amount of a change in the resistance of the user input unit; and
turning on the infrared light source when the luminance obtained is below a reference value.

13. The method of claim 11, wherein the user input unit includes an infrared light source configured to enhance the luminance of the surroundings, and wherein the method further comprises:
obtaining the luminance of the surroundings of the user by analyzing the outside image; and
turning on the infrared light source when the obtained luminance is below a predetermined reference value.

14. The method of claim 11, wherein the user input unit includes a luminance sensor configured to detect the luminance of the surroundings of the user and an infrared light source configured to enhance the luminance of the surroundings of the user,
wherein the method further comprises:
obtaining the luminance of the surroundings of the user based on an output value of the luminance sensor; and
turning on the infrared light source when the luminance obtained is below a predetermined reference value.

15. A method of controlling a digital imaging apparatus, the method comprising:
generating by an user input unit an outside image signal corresponding to an outside image;
compressing the outside image signal by using a Motion Joint Photographic Experts Group (MJPEG) encoder into an MJPEG compressed outside image signal;
transmitting the MJPEG compressed outside image signal to a body of the digital imaging apparatus through a data interface;
receiving at the body the MJPEG compressed outside image signal transmitted through the data interface and decoding the MJPEG compressed outside image signal by using an MJPEG decoder into a decoded outside image signal;
recognizing a user based on the decoded outside image signal, and executing an application of the digital imaging apparatus based on a result of the recognizing;
displaying an image based on the decoded outside image signal;
compressing the decoded outside image signal into a compressed outside image signal; and
transmitting the compressed outside image signal to an outside apparatus.

16. The method of claim 15, further comprising:
compressing the decoded outside image signal in a predetermined format and transmitting the outside image signal compressed in the predetermined format to an opposite user.

17. An imaging apparatus comprising:
an image photographing device configured to photograph an outside image and generate an outside image signal corresponding to the outside image;
a data interface configured to receive the outside image signal from the image photographing device and to transmit the outside image signal to the body; and
a body comprising;
a display unit configured to receive the outside image signal from the data interface and output the image signal in the form of an image;
an image encoder configured to receive the outside image signal from the data interface and compress the outside image signal into an encoded signal; and
a communicator configured to transmit the encoded signal to an outside apparatus.

* * * * *